W. A. BUTLER AND A. V. COOPER.
PRACTICE KEYBOARD.
APPLICATION FILED MAY 8, 1919.

1,328,818.

Patented Jan. 27, 1920
2 SHEETS—SHEET 1.

Inventors
Walter A. Butler
Arthur V. Cooper
By Frank C. Curtis
atty.

W. A. BUTLER AND A. V. COOPER.
PRACTICE KEYBOARD.
APPLICATION FILED MAY 8, 1919.
1,328,818.
Patented Jan. 27, 1920.
2 SHEETS—SHEET 2.
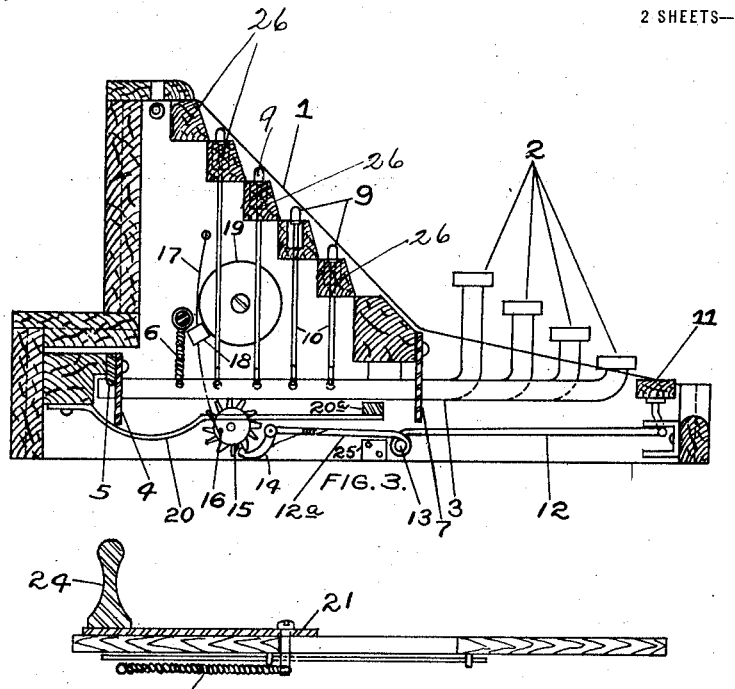
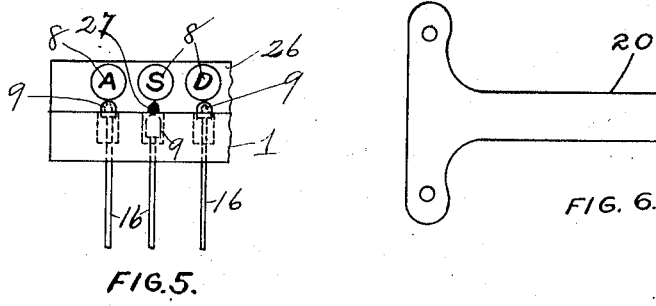
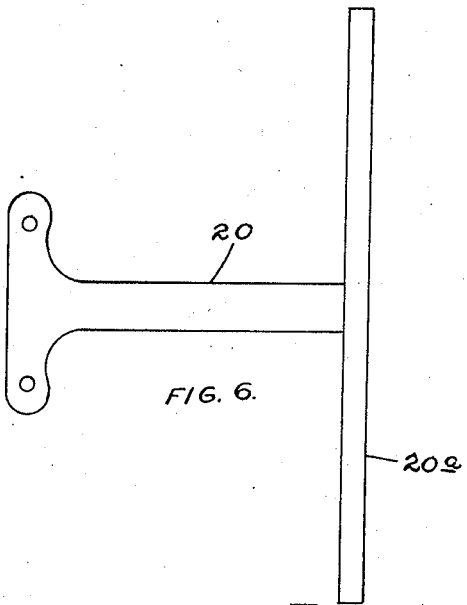
Inventors
Walter A. Butler
& Arthur V. Cooper
By Frank C. Curtis
atty.

UNITED STATES PATENT OFFICE.

WALTER A. BUTLER, OF TROY, AND ARTHUR V. COOPER, OF AMBOY, NEW YORK.

PRACTICE-KEYBOARD.

1,328,818.　　　　Specification of Letters Patent.　　Patented Jan. 27, 1920.

Application filed May 8, 1919. Serial No. 295,650.

*To all whom it may concern:*

Be it known that we, WALTER A. BUTLER, a citizen of the United States, resident of Troy, county of Rensselaer, and State of New York, and ARTHUR V. COOPER, a citizen of the United States, resident of Amboy, county of Oswego, and State of New York, have invented certain new and useful Improvements in Practice-Keyboards, of which the following is a specification.

Reference may be had to the accompanying drawings, and the reference characters marked thereon, which form a part of this specification. Similar characters refer to similar parts in the several figures therein.

This invention relates to practice keyboards adapted for training students for the use of various key-actuated machines; and it is particularly adapted for training students in learning the touch system in the operation of typewriting machines.

One of the objects of the invention is to induce the operator to look otherwise than at the keys which he is operating.

Other objects will appear in connection with the following description.

Figure 1 of the drawings is a top plan view of our improved practice keyboard.

Fig. 3 is a vertical section from front to rear of the machine taken on the line 3—3 in Fig. 1.

Fig. 4 is a view in vertical cross section taken on the line 4—4 in Fig. 1.

Fig. 5 is a view in front elevation of part of one of the tiers of characters with the associated indicators showing one of the indicators depressed.

Fig. 6 is a top plan view of a spring frame whereby the downward movement of the keys is yieldingly resisted and finally arrested.

Figure 1:
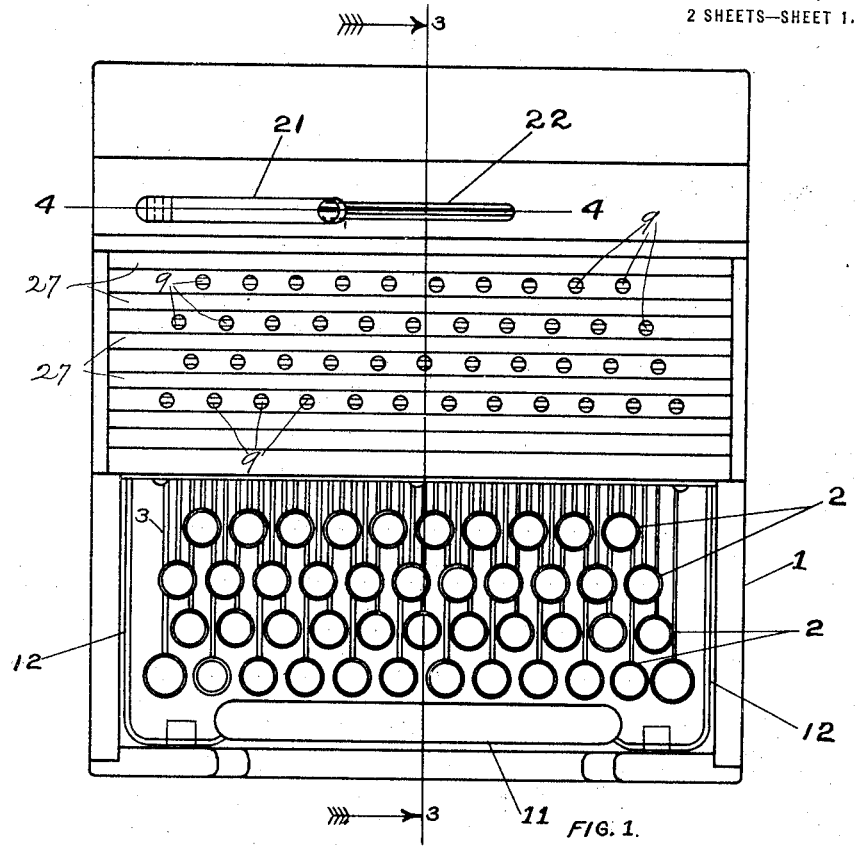
Figure 2:
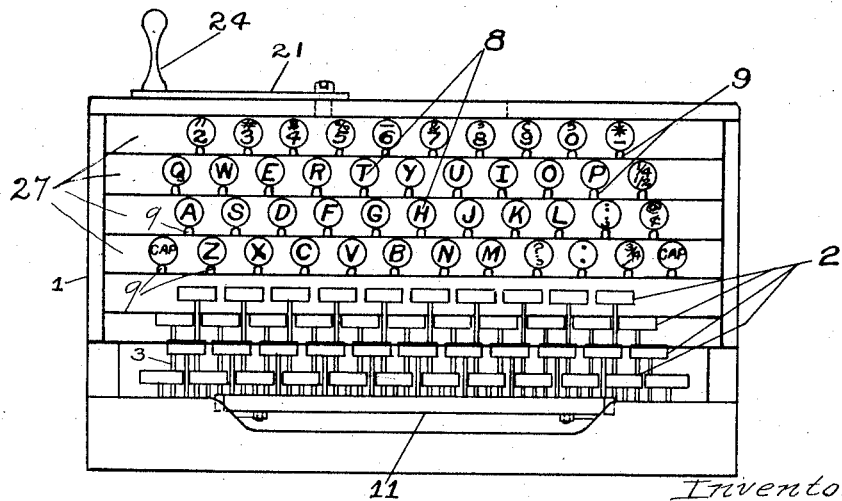
Fig. 2 is a view in front elevation of the same.

Referring to the drawings wherein the invention is shown in preferred form, 1 is the frame of the machine which is somewhat similar to the frame of an ordinary typewriting machine.

Upon this frame are mounted a series of keys, 2, similar to typewriter keys each key being carried by a lever, 3, all of said levers passing through a comb, 4, at their inner ends, and being fulcrumed at 5 at their inner ends, each lever being yieldingly supported in raised position by a coil-spring, 6.

The front ends of the levers, 3, pass through and are guided by a comb, 7.

The keys, 2, are thus yieldingly supported and can be depressed by the fingers in the same manner as ordinary typewriter keys.

The keys, 2, are preferably banked in tiers in simulation of typewriter keys.

At the rear of the bank of keys, 2, are a like series of characters, 8, similarly banked in tiers and indicating values for the respective keys, 2, said keys preferably bearing no characters to indicate their value.

Just in front of each of the characters, 8, is a vertically movable indicator, 9, connected by a rod, 10, with the lever, 3, of the key, 2, whose value said character indicates.

The parts are so arranged that when a key, 2, is depressed it will through its link-connection, 10, depress the indicator, 9, of the character, 8, which expresses the value of the depressed key, 2.

The operator by manipulating the keys, 2, and watching the characters, 8, can readily learn by the depression of the indicators, 9, whether a key of the intended value has been depressed.

At the front of the machine is a space-bar, 11, similar to the space-bar of a typewriting machine, which bar is mounted upon a U-shaped frame, 12, the branches of which are rockably mounted upon pins, 13, on the opposite sides of the frame, one of said branches having an extension, 12ª which carries a pawl, 14, engageable with a ratchet, 15, mounted upon the frame of the machine.

A pin, 16, on the ratchet, 15, is adapted to engage a trip, 17, and to release the trip at each rotation of the ratchet-wheel, permitting the trip to force a hammer, 18, against a bell, 19, mounted upon the frame of the machine.

To simplify the bell-sounding mechanism we assume an average of twelve words to a line, and therefore provide the ratchet, 15, with twelve teeth and operate the ratchet by the movement of the space-bar only, thus making it unnecessary to have the bell-sounding mechanism actuated by the operation of the keys, 2.

A T-shaped spring, 20, is mounted upon the frame of the machine projecting forwardly with its T-head 20ᵃ, extending crosswise beneath the several key-levers in position to be engaged by the levers when the keys are depressed.

At the limit of the intended downward movement, the ends of the head of this spring frame, 20, engage stops or brackets, 25, on the frame of the machine.

The spring, 20, thus adds to the resistance offered to the downward movement of the keys and also limits the downward movement of the keys to substantially the movement permitted to the keys in a typewriter machine.

A slide, 21, is reciprocatingly mounted in a slideway, 22, in the top of the frame of the machine which slide is yieldingly controlled by a coil-spring, 23, tending to draw said slide toward the left-hand end of the machine.

This slide, 21, carries a thumb-piece, 24, whereby the slide can be moved to the right against the force of the spring, 23.

The operation of the apparatus is as follows.

The operator manipulates the keys, 2, and space-bar, 11, in the same manner as the keys, and space-bar of an ordinary typewriting machine, and by watching the bank of characters, 8, can soon learn the values of the respective keys.

The operation of the space-bar, 11, imparts a step-by-step movement to the ratchet-wheel, 15, and upon the completion of each rotation of the ratchet-wheel, the bell, 19, is automatically sounded. The signal thus given corresponds with that given at the end of each line in the operation of a typewriting machine.

When the bell, 19, is thus sounded the operator pushes the slide, 21, to the right by means of the thumb-piece, 24, which operation corresponds with that of returning the carriage of a typewriting machine to initial position.

The characters, 8, may express the value of the keys, 2, by letters, figures, words or other devices.

The characters, 8, are banked in tiers by locating said characters upon a series of bars, 26, in stepped arrangement on the frame of the machine.

Immediately below each of the characters, 8, we preferably place a pointer-character, 27, which is normally covered or concealed by the indicator, 9, of that character, so that when the indicator is depressed by operation of the corresponding key, 2, the character is not only indicated by the movement of the indicator, 9, but also by the pointer, 27.

As the keys are operated with more or less rapidity this manner of indicating the characters causes somewhat of an optical illusion making it appear as though the characters were successively pointed out by movement of the pointers, 27.

It is immaterial whether the slide, 21, and thumb-piece, 24, be movably mounted to be moved by the right-hand or movably mounted to be moved by the left-hand of the operator.

By the use of our invention, the successive letters forming a word are indicated or pointed out in the same relative positions as are the keys whose values the letters respectively represent.

What we claim as new and desire to secure by Letters Patent is—

1. In a practice keyboard and in combination, a bank of keys; a correspondingly arranged bank of permanently visible characters expressing values for the respective keys; a movable indicator for each of said characters; and means for moving the several indicators by operation of the respective keys.

2. In a practice keyboard and in combination, a series of keys banked in tiers; a series of permanently visible characters similarly banked in tiers expressing values for the respective keys; a movable indicator for each of said characters; and means for moving the several indicators by operation of the respective keys.

3. In a practice keyboard and in combination, a frame; a series of keys banked in tiers upon said frame; a like series of levers fulcrumed upon said frame in connection with the respective keys; a like series of permanently visible characters similarly banked in tiers upon said frame expressing values for the respective keys; movable indicators for the respective characters; and connections between the respective indicators and key-levers.

4. In a practice keyboard and in combination, a bank of keys; a separate correspondingly arranged bank of characters expressing values for the respective keys; a movable indicator for each of said characters; means for moving the several indicators by operation of the respective keys; a space-bar; a bell; a trip for the bell; and trip-releasing step-by-step mechanism actuated by the movement of said space-bar.

5. In a practice keyboard and in combination, a bank of keys; a separate correspondingly arranged bank of characters expressing values for the respective keys; a movable indicator for each of said characters; means for moving the several indicators by operation of the respective keys; and a spring-controlled thumb-piece capable of limited movement by hand.

6. In a practice keyboard and in combination, a bank of keys; a separate correspondingly arranged bank of characters expressing values for the respective keys; a movable indicator for each of said characters; means for moving the several indicators by operation of the respective keys; a space-bar; a bell; a trip for the bell; trip-releasing step-by-step mechanism actuated by the movement of said space-bar; and a spring-controlled thumb-piece capable of limited movement by hand.

7. In a practice keyboard and in combination, a bank of keys; a correspondingly arranged bank of characters expressing values for the respective keys; a movable indicator for each of said characters; means for moving the several indicators by operation of the respective keys; and a stationary pointer for the respective characters normally covered and concealed by the corresponding indicator and exposed to view by the key-induced movement of said indicator.

In testimony whereof, we have hereunto set our hands this 25th day of April, 1919.

WALTER A. BUTLER.
ARTHUR V. COOPER.